(12) United States Patent
Roe et al.

(10) Patent No.: US 11,764,490 B2
(45) Date of Patent: *Sep. 19, 2023

(54) OPERATING A MODAL ANTENNA SYSTEM FOR POINT TO MULTIPOINT COMMUNICATIONS

(71) Applicant: KYOCERA AVX Components (San Diego), Inc., San Diego, CA (US)

(72) Inventors: Michael Roe, San Diego, CA (US); Norik Dzhandzhapanyan, San Diego, CA (US); Sebastian Rowson, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,042

(22) Filed: May 27, 2022

(65) Prior Publication Data

US 2022/0302605 A1    Sep. 22, 2022

Related U.S. Application Data

(63) Continuation of application No. 16/655,555, filed on Oct. 17, 2019, now Pat. No. 11,387,577.

(Continued)

(51) Int. Cl.
*H01Q 25/04* (2006.01)
*H04B 17/309* (2015.01)
(Continued)

(52) U.S. Cl.
CPC .............. *H01Q 25/04* (2013.01); *H04B 1/38* (2013.01); *H04B 17/309* (2015.01); *H04B 7/0408* (2013.01); *H04J 3/00* (2013.01)

(58) Field of Classification Search
CPC .......... H01Q 25/04; H01Q 1/243; H01Q 1/50; H01Q 5/385; H01Q 5/40; H01Q 9/0421;
(Continued)

(56) References Cited

U.S. PATENT DOCUMENTS

| 6,765,536 | B2 | 7/2004 | Phillips et al. |
| 6,987,493 | B2 | 1/2006 | Chen |

(Continued)

FOREIGN PATENT DOCUMENTS

WO    WO 2017-206100    12/2017

OTHER PUBLICATIONS

European Search Report for Application No. EP 19 89 9484, completed May 18, 2022, 9 pages.

(Continued)

*Primary Examiner* — Rushil Parimal Sampat
(74) *Attorney, Agent, or Firm* — Dority & Manning, P.A.

(57) ABSTRACT

Systems and methods for point to multipoint communications are provided. In one example, a system includes one or more modal antennas. Each modal antenna is configured to operate in a plurality of modes. The system can include a transceiver configured to communicate with a plurality of client devices over a wireless communication medium via the one or more modal antennas over a plurality of frames. The system can include one or more control devices configured to control the operation of the one or more modal antennas. For each of the plurality of frames communicated to one of the plurality of client devices, the one or more control devices are configured to determine a selected mode of the plurality of modes to communicate during the frame and to operate at least one of the one or more modal antennas in the selected mode during the frame.

3 Claims, 11 Drawing Sheets

Related U.S. Application Data

(60) Provisional application No. 62/773,454, filed on Nov. 30, 2018.

(51) Int. Cl.
*H04B 1/38* (2015.01)
*H04B 7/0408* (2017.01)
*H04J 3/00* (2006.01)

(58) Field of Classification Search
CPC ...... H04B 17/309; H04B 1/38; H04B 7/0408; H04J 3/00; H04W 24/02; H04W 84/12; H04W 24/00; G01S 3/00; G01S 3/02; G01S 3/14; G01S 3/30; G01S 3/32; G01S 3/16; G01S 3/28; G01S 3/06
See application file for complete search history.

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin et al. | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,590,703 B2 | 3/2017 | Desclos et al. | |
| 9,609,654 B1 | 3/2017 | Desclos et al. | |
| 9,748,637 B2 | 8/2017 | Rowson et al. | |
| 9,755,305 B2 | 9/2017 | Desclos et al. | |
| 9,755,580 B2 | 9/2017 | Desclos et al. | |
| 9,883,514 B2 | 1/2018 | Park et al. | |
| 10,942,243 B2 | 3/2021 | Pajona et al. | |
| 2011/0129009 A1 | 6/2011 | Doan et al. | |
| 2013/0072247 A1 | 3/2013 | Park et al. | |
| 2013/0109333 A1 | 5/2013 | Rowson et al. | |
| 2014/0055302 A1 | 2/2014 | Jia | |
| 2014/0376534 A1 | 12/2014 | Pajona et al. | |
| 2015/0311969 A1* | 10/2015 | Desclos | H04W 40/12 455/63.4 |
| 2016/0095130 A1 | 3/2016 | Ho | |
| 2016/0112147 A1 | 4/2016 | Seo et al. | |
| 2017/0264357 A1 | 9/2017 | Takahashi et al. | |
| 2018/0007703 A1 | 1/2018 | Pajona et al. | |
| 2018/0342803 A1 | 11/2018 | Desclos et al. | |

OTHER PUBLICATIONS

PCT International Search Report and Written Opinion for corresponding PCT Application No. PCT/US2019/056667, dated Feb. 4, 2020, 10 pages.

* cited by examiner

OPERATING A MODAL ANTENNA SYSTEM FOR POINT TO MULTIPOINT COMMUNICATIONS

PRIORITY CLAIM

The present application claims the benefit of priority of U.S. application Ser. No. 16/655,555, titled "CHANNEL QUALITY MEASUREMENT USING BEAM STEERING IN WIRELESS COMMUNICATION NETWORKS" filed on Oct. 17, 2019, now issued as: U.S. Pat. No. 11,387,577 B2 which claims the benefit of priority of U.S. Provisional Application Ser. No. 62/773,454, titled "Operating a Modal Antenna System for Point to Multipoint Communications," filed on Nov. 30, 2018, which is incorporated herein by reference for all purposes.

FIELD

The present disclosure relates generally to antenna systems, and more particularly to systems and methods for operating modal antenna systems for point to multipoint communications.

BACKGROUND

Wireless communications systems can often include a base station or access point configured to communicate with multiple devices, such as one or more smartphones, laptops, desktops, printers, smart TVs, tablets, internet-of-things devices, and other devices. For instance, multiple devices can communicate over a wireless local area network (WLAN) via an access point (e.g., a wireless router). A WiFi network can include a WLAN where devices communicate with an access point using IEEE 802.11 standards. Access points for WLAN can include one or more antennas for wirelessly communicating with multiple client devices.

SUMMARY

Aspects and advantages of embodiments of the present disclosure will be set forth in part in the following description, or may be learned from the description, or may be learned through practice of the embodiments.

One example aspect of the present disclosure is directed to a communication system for point to multipoint communications. The system includes one or more modal antennas. Each modal antenna is configured to operate in a plurality of modes. Each of the plurality of modes can be associated with a distinct radiation pattern. The system can include a transceiver configured to communicate with a plurality of client devices over a wireless communication medium via the one or more modal antennas over a plurality of frames. The system can include one or more control devices configured to control the operation of the one or more modal antennas. For each of the plurality of frames communicated to one of the plurality of client devices, the one or more control devices are configured to determine a selected mode of the plurality of modes to communicate during the frame and to operate at least one of the one or more modal antennas in the selected mode during the frame.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
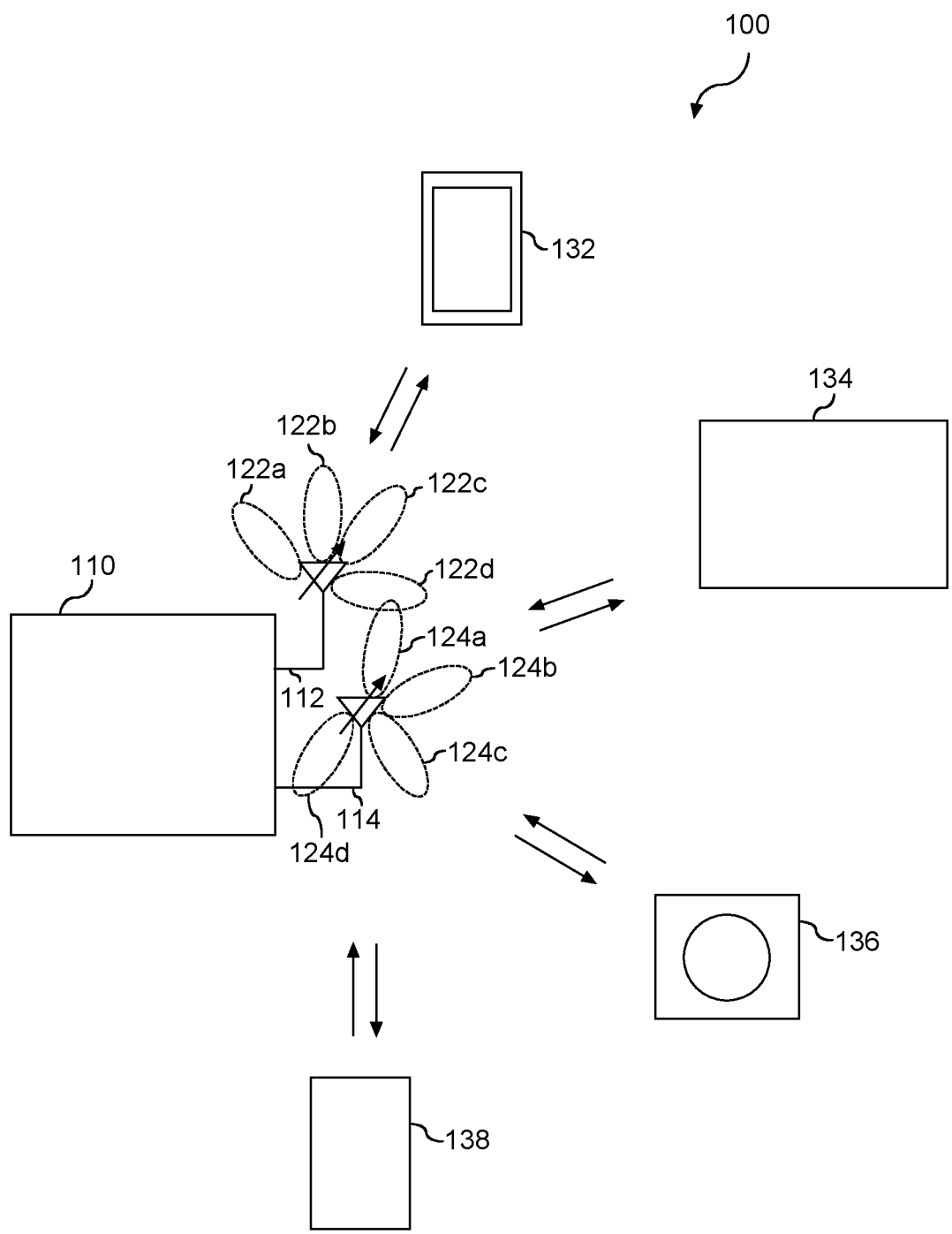
FIG. 1 depicts an example communication system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to operation of modal antennas in a communication system for improved point to multipoint communications, such as in a wireless local area network (WLAN) (e.g., a WiFi network) or other point to multipoint network. A point to multipoint communication system can include a base station or terminal configured to communicate wirelessly with a plurality of different client devices. For instance, the base station can be a wireless router serving as a WLAN access point for a plurality of electronic devices, such as one or more smartphones, tablets, desktops, laptops, printers, internet of things devices, smart TVs, and other electronic devices.

The base station can be configured to communicate wirelessly with the client devices using one or more modal antennas. The modal antenna(s) can be configured in a plurality of different modes. Each mode can be associated with distinct radiation pattern characteristics (e.g., distinct polarization and/or distinct radiation pattern). In some embodiments, the modal antennas can include one or more parasitic elements that are distinct from a radiating element. One or more active elements (e.g., switches, etc.) can be controlled to adjust electrical characteristics of the one or more parasitic elements to configure the modal antenna in one of a plurality of different modes. Example modal antennas will be discussed in more detail with reference to FIGS. 11-13. In this way, the modal antenna(s) can be controlled, for instance, to point radiation lobes in a direction of intended RF communication gain and/or to point nulls to desired locations (e.g., to mitigate interference). As used herein, a modal antenna refers to any antenna(s) that can be configurable in a plurality of different modes with each mode associated with distinct radiation pattern characteristics.

In some example embodiments, the base station can be configured to communicate with the one or more client devices using a time division multiplexing scheme. The time division multiplexing scheme can allocate transmit and receive frames for different clients to different time slots on the same frequency band or multiple frequency bands. According to example aspects of the present disclosure, the one or more modal antennas can be operated to enhance signal quality in wireless communication between the base station and a plurality of different client devices by configuring the modal antennas on a per frame, per client basis (e.g., per frame, per client, per antenna basis) to provide enhanced signal quality with each individual client device. The base station can be configured to communicate using other multiplexing schemes or communication schemes without deviating from the scope of the present disclosure.

In some implementations, for each frame, one or more control devices configured to control operation of the modal antennas can identify the client device with which the base station is communicating for the frame. Based on the client device, the one or more control devices can select a mode of the plurality of modes for operation of the modal antenna(s). The mode can be selected, for instance, based on a channel quality indicator(s) (CQI) associated with communication to the client device in the mode. The mode can be selected to increase channel quality and/or to optimize channel quality with the client device for the frame.

As used herein, a frame represents a division of time in a communication scheme. A base station can communicate with one or more client devices during a frame. For instance, a base station can receive from client device(s) in a receive frame. A base station can transmit to client device(s) in a transmit frame.

Example CQIs that can be used in antenna mode selection can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics. The CQIs can be used to characterize uplink signal quality between the base station and the client device and/or to characterize downlink signal quality between the base station and the client device.

In one example implementation, the selected mode of the modal antenna(s) for a frame can be determined using client index data. Client index data can include data that associates a particular mode for one or more modal antenna(s) to a particular client device. For instance, the client index data can correlate a best mode (e.g., mode with the highest or near highest CQI metric) of a modal antenna(s) with a particular client device. The client index data can be stored and/or implemented in one or more memory devices. The client index data can be implemented as a lookup table, matrix, data structure, function, algorithm or other implementation that correlates a particular mode of a modal antenna to a client device.

In some embodiments, the client index data can be generated by operating the communication system in a training mode. During the training mode, the system controls the modal antenna(s) to operate in each of the plurality of different modes. While operating in each mode, the system obtains CQI(s) for communicating with each client device. The CQI(s) can be analyzed to determine which mode (e.g., in a best or near optimum mode) is desired for communicating with a particular client device to improve signal quality. This mode can be associated with the particular client device in the client index data.

The training mode can be implemented upon the occurrence of various different trigger conditions. For instance, the trigger condition can be associated with startup or set up of the communication system. As another example, a trigger condition can be the passage of a period of time. In this way, the system can implement the training mode at regular and/or irregular time intervals.

In some embodiments, the trigger condition can be based on a CQI change or based on a use condition. For instance, the system can implement the training mode when a CQI associated with communicating to a particular client device changes by a threshold amount. As another example, the system can implement the training mode when a location associated with client has moved by a threshold amount (e.g., as determined from, for instance, signal strength, data from a positioning system, etc.). In some embodiments, the training mode can be implemented when a new client device joins the communication system.

In one particular example, the training mode can be implemented as an interframe training mode that occurs across a plurality of frames for communicating between the base station and a client device. During the interframe training mode, frames are used to obtain CQIs while operating the modal antennas in each of the plurality of modes. The CQIs can be analyzed to determine which mode provides an optimum or improved CQI for communicating with a particular client device. The determined mode can be associated with the client device in the client index data. In some embodiment, the training mode can be implemented using both transmit frames and receive frames. In some embodiments, the training mode can be implemented using only the receive frames to maintain increased signal quality during transmit frames, and vice versa.

In another particular example, the training mode can be implemented as an intraframe training mode. During the intraframe training mode, CQIs can be obtained for multiple modes within a single frame, such as a single receive frame or single transmit frame.

The communications systems and methods according to example aspects of the present disclosure can provide a number of technical effects and benefits. For instance, using selected modes of a modal antenna on a per frame, per client basis (e.g., per frame, per client, per antenna basis) can improve signal quality of communications between the base station and the plurality of client devices in a network. This can lead to reduced communication errors and faster uplink/downlink times in point to multipoint communications.

FIG. 1 depicts an example point to multipoint communication system 100 according to example aspects of the present disclosure. The communication system 100 includes a base station 110. In some embodiments, the base station 110 can be wireless network access point, such as a wireless local area network access point (WLAN), such as for a WiFi network. Aspects of the present disclosure are discussed with reference to a WLAN such as a WiFi network for purposes of illustration and discussion. Those of ordinary skill in the art, using the disclosures provided herein, will understand that the point to multipoint communication system can be implemented in other infrastructures/communication systems (e.g., cellular, etc.) without deviating from the scope of the present disclosure.

The base station 110 is in wireless communication with a plurality of client devices 132, 134, 136 and 138. The plurality of client devices 132, 134, 136, and 138 can include, for instance, one or more smartphones, tablets, laptops, desktops, wearable devices, printers, internet of things devices, appliances, or other electronic devices. The base station 110 can communicate with the plurality of client devices 132, 134, 136, and 138 using any a wireless communication protocol. One example protocol can include any of the IEEE 802.11 protocols associated with WiFi networks.

Four client devices 132, 134, 136, and 138 are illustrated in FIG. 1 for example purposes. Any number of client devices can be included in the communication system without deviating from the scope of the present disclosure.

The base station 110 can include one or more modal antennas for communicating with the client devices 132, 134, 136, and 138. In the example of FIG. 1, the base station 110 includes a first modal antenna 112 and a second modal antenna 114. The base station can include more or fewer antennas without deviating from the scope of the present disclosure.

The modal antennas 112 and 114 can be configured to be operated in a plurality of different modes. Each mode can be associated with a different radiation pattern. For instance, first modal antenna 112 can be operated in a first mode to provide radiation pattern 122a. The first modal antenna 112 can be operated in a second mode to provide radiation pattern 122b. The first modal antenna 112 can be operated in a third mode to provide radiation pattern 122c. The first modal antenna 112 can be operated a fourth mode to provide radiation pattern 122d.

Similarly, the second modal antenna 114 can be operated in a first mode to provide radiation pattern 124a. The second modal antenna 114 can be operated in a second mode to provide radiation pattern 124b. The second modal antenna 114 can be operated in a third mode to provide radiation pattern 124c. The second modal antenna 114 can be operated a fourth mode to provide radiation pattern 124d.

Aspects of the present disclosure are discussed with reference to modal antennas configured to be operated in four modes for purposes of illustration and discussion. Those of ordinary skill in the art, using the disclosures provided herein, will understand that any of the modal antennas discussed herein can be operated in more or fewer modes without deviating from the scope of the present disclosure.

In some embodiments, the first modal antenna 112 and/or the second modal antenna 114 can include an active radiating element and one or more parasitic elements positioned proximate to the active radiating element. Active elements can be configured to selectively couple the parasitic elements to ground or otherwise adjust electrical characteristics associated with the parasitic elements to adjust the radiation pattern provided by the active radiating element to operate the modal antenna in one of the plurality of different modes. Example modal antennas will be discussed in more detail with reference to FIGS. 11-13.

As one example, the base station 110 can be configured to communicate with one or more of the client devices 132, 134, 136, and 138 in a time division multiplexed manner. The time division multiplexing scheme can allocate transmit and receive frames for different clients to different time slots on the same frequency band. Example frequency bands for can include, for instance, frequency bands associated with IEEE 802.11 communication, such as 2.4 GHz, 3.6 GHz, and 5 GHz bands. Other frequency bands can be used without deviating from the scope of the present disclosure.

Example aspects of the present disclosure are directed to configuring one or more of the multimode antennas 112 and 114 to increase signal quality on a per frame, per client, per antenna basis. More particularly, for each frame, one or more of the multimode antennas 112 and 114 can be operated in a selected mode to improve communication with one or more of the client devices 132, 134, 136, and 138. During the next frame when communicating with a different client device, one or more of the multimode antennas 112 and 114 can be configured in a different mode to enhance signal quality with the different client device.

Figure 2:
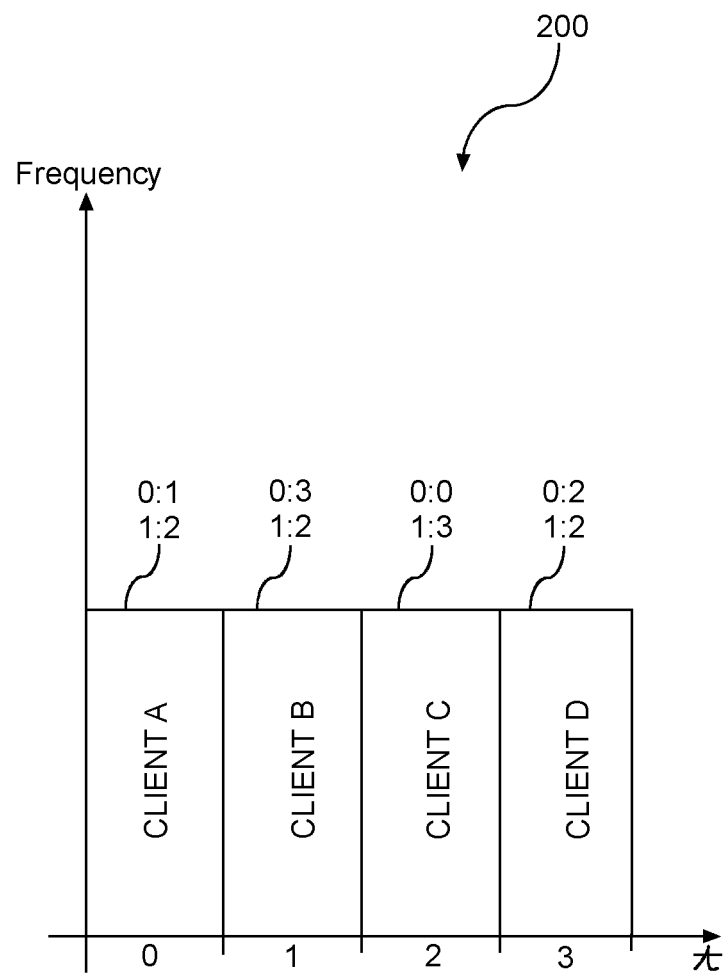
FIG. 2 depicts a graphical representation of example communication from an access point to multiple client devices according to example embodiments of the present disclosure.

FIG. 2 depicts a graphical representation 200 of operation of a point to multipoint communication system according to example embodiments of the present disclosure. FIG. 2 plots time along the horizontal axis and frequency band along the vertical axis. As shown, the base station communicates with four different client devices (e.g., client A, client B, client C, and client D) in a time division multiplexed manner. More particularly, time can be subdivided into a plurality of frames. During each frame, the base station can communicate with (e.g., transmit or receive) one of the plurality of clients over the same frequency band. For example, as shown in FIG. 2, the base station communicates with client A during frame 0. The base station communicates with client B during frame 1. The base station communicates with client C during frame 2. The base station communicates with client D during frame 3.

Two modal antennas can be configured in different modes in different frames depending on the client with which the base station is communicating. The modes of the antennas are designated using the nomenclature x:y with x representing the antenna and y representing the mode of the antenna.

More particularly, during frame 0 while communicating with client A, modal antenna 0 is configured in mode 1 and modal antenna 1 is configured in mode 2. During frame 1 while communicating with client B, modal antenna 0 is configured in mode 3 and modal antenna 1 is configured in mode 2. During frame 2 while communicating with client C, modal antenna 0 is configured in mode 0 and modal antenna 1 is configured in mode 3. During frame 3 while communicating with client D, modal antenna 0 can be configured in mode 2 and modal antenna 1 can be configured in mode 2. In this way, the communication system signal quality can be increased on a per frame basis for communication with each individual client.

FIG. 2 depicts communication using a time division multiplexing scheme for purposes of illustration and discussion. Example aspects of the present disclosure can be used with other multiplexing scheme or communication schemes without deviating from the scope of the present disclosure.

Figure 3:
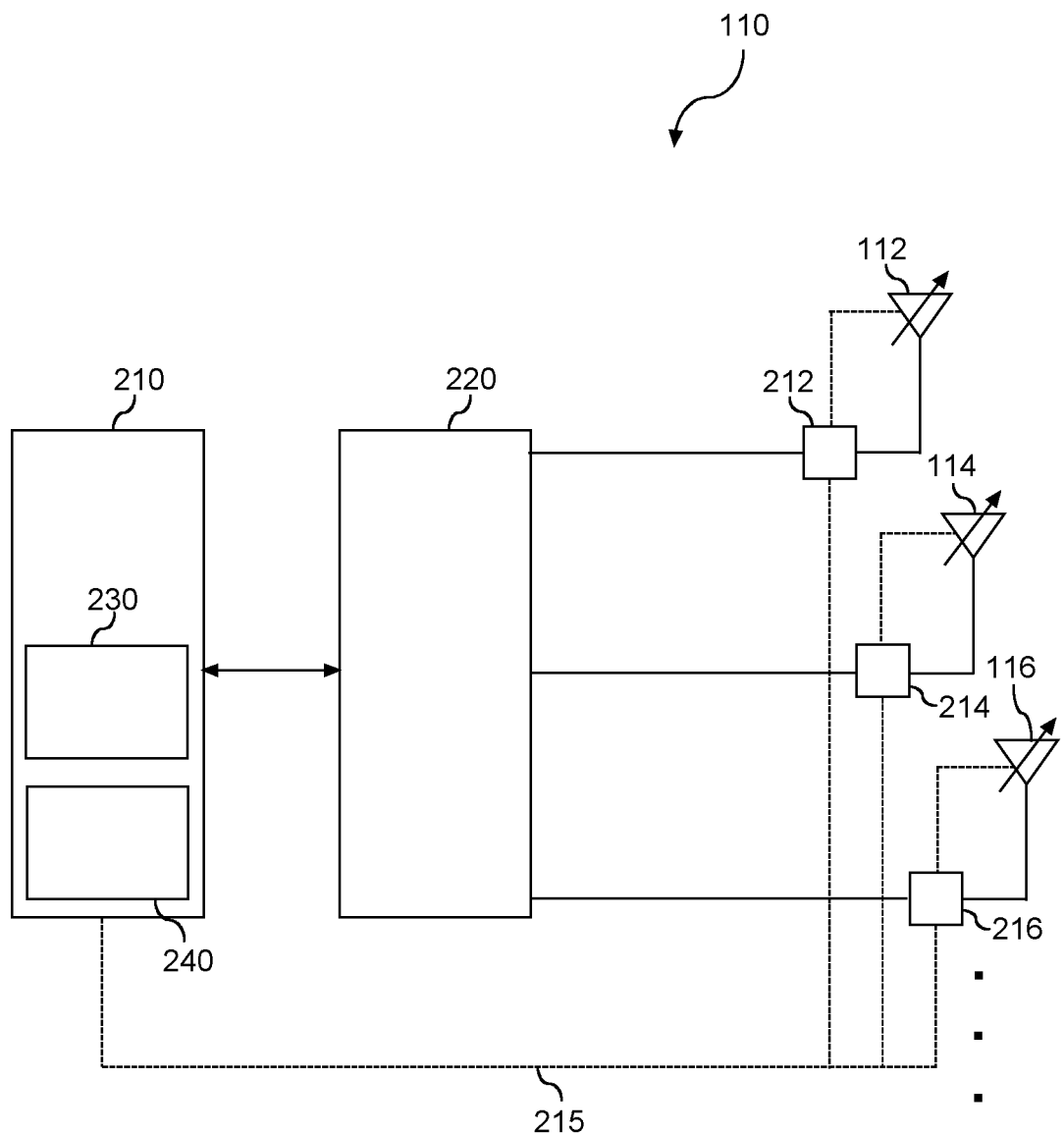
FIG. 3 depicts a schematic of an example access point according to example embodiments of the present disclosure.

FIG. 3 depicts a schematic of an example base station 110 according to example embodiments of the present disclosure. The base station 110 includes RF circuitry 220 (e.g., transceiver, front end module, etc.) The RF circuitry 220 can be configured to communicate RF signals over transmission lines to modal antennas 112, 114, 116, etc. More or fewer modal antennas can be used in the base station 110 without deviating from the scope of the present disclosure.

The RF circuitry 220 can encode information in RF signals for communication via one or more antennas 112, 114, and 116. The RF circuitry 220 can include one or more multiplexing circuits configured to control the communication of frames in, for instance, a time division multiplexed manner. The RF circuitry 220 can include other components for conditioning the RF signals communicated by antennas 112, 114, and 116, such as one or more transceivers, impedance matching circuits, low noise amplifiers, power amplifiers, etc.

As shown, the base station 110 includes one or more control devices 210. The control device(s) 210 can be any device capable of controlling operation of components of the base station 110. For instance, the control device(s) can include one or more processors (e.g., a host processor, baseband processor, etc.). In some embodiments, the control device(s) can execute computer-readable instructions stored in memory to cause the control device(s) to perform operations, such as any of the operations disclosed herein.

The control device(s) 210 can control the modal antennas by sending control signals via one or more control lines 215 to antenna configuring modules 212, 214, and 216. Antenna configuration modules 212 can include, for instance, RF switch(es), MEMs switch(es), tunable capacitor(s), tunable inductor(s), PIN diode(s), combinations of the forgoing, or other suitable components. Antenna configuring module 212 can include and/or can control the modal antenna 112 to configure the antenna 112 in one of a plurality of different modes based on control signal(s) received from control device(s) 210 over control line(s) 215. Antenna configuration module 214 can include and/or can control modal antenna 114 to configure the antenna 114 in one of a plurality of different modes based on control signal(s) received from control device(s) 210 over control line(s) 215. Antenna configuration module 216 can include and/or can control modal antenna 116 to configure the antenna 116 in one of a plurality of different modes based on control signal(s) received from control device(s) 210 over control line(s) 215.

The control device(s) 210 can execute a control routine 230 (e.g., algorithm) that configures the mode of the one or more of the modal antennas 112, 114, 116 on a per frame, per client basis, per antenna basis to enhance signal quality with communication to client device(s). For instance, during a first frame when communicating with a first client device, the control device(s) 210 can configured to operate one or more of the modal antenna(s) 112, 114, 116 in a first set of modes. During a second frame when communicating with a second client device, the control device(s) 210 can configured to operate one or more of the modal antenna(s) 112, 114, 116 in a second set of modes.

The control routine 230 can select a set of modes for operating the one or more antennas 112, 114, 116 to enhance signal quality and/or optimize signal quality of communication with a client device during the frame. In some embodiments, the control routine 230 can select the set of modes based on CQI(s) associated with communicating with the client device during the frame to enhance signal quality. The CQI(s) can include one or more of can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics.

In some embodiments, the control routine 230 can select a set of modes can select a set of modes for operating the one or more antennas 112, 114, 116 to enhance signal quality and/or optimize signal quality of communication with a client device during the frame based on client index data 240. Client index data can include data that associates a particular mode for modal antennas 112, 114, and 116 to a particular client device. For instance, the client index data 240 can correlate an optimum mode (e.g., mode with the highest or near highest CQI metric) of a modal antenna(s) with a particular client device. The client index data can be stored and/or implemented in one or more memory devices. The client index data can be implemented as a lookup table, matrix, data structure, function, algorithm or other implementation that correlates a particular mode of a modal antenna to a client device.

Figure 4:
FIG. 4 depicts example client index data according to example embodiments of the present disclosure.

A representation of example client index data 240 is shown in FIG. 4. As shown, client index data 240. As shown, the example client index data 240 associated modes of antennas 0, 1, 2, and 3 with client devices A, B, C, and D. Client devices A, B, C, and D can be, for instance, client devices 132, 134, a136 and 138 of FIG. 4. During a frame, the control device(s) 210 (FIG. 3) can determine (based on signals from RF circuitry) that a particular communication packet is associated with one of clients A, B, C, and D. During the frame, the control device(s) 210 can access the client index data 240 to determine the modes to operate one or more of the modal antenna(s) 0, 1, 2, and 3. The control device(s) 210 can control one or more of the antenna(s) 210 in the determined mode(s) during the frame. This process can repeat on a per frame basis.

As an illustration, using the example client index data of FIG. 4, during a first frame of communication with client A, one or more of the antennas 0, 1, 2, and 3 can be configured as follows: antenna 0 in mode 0; antenna 1 in mode 2; antenna 2 in mode 3; antenna 3 in mode 1. During a second frame of communication with client B, one or more of the antennas 0, 1, 2, and 3 can be configured as follows: antenna 0 in mode 3; antenna 1 in mode 1; antenna 2 in mode 0; antenna 3 in mode 2. During a third frame of communication with client C, one or more of the antennas 0, 1, 2, and 3 can be configured as follows: antenna 0 in mode 0; antenna 1 in mode 0; antenna 2 in mode 2; antenna 3 in mode 1. During a fourth frame of communication with client D, one or more of the antennas 0, 1, 2, and 3 can be configured as follows: antenna 0 in mode 1; antenna 1 in mode 2; antenna 2 in mode 2; antenna 3 in mode 3.

The client index data 240 can be based on CQI. For instance, the modes associated with each client device can be determined for the client index data 240 based on CQI associated with communicating with the client device. Example methods for training/generating client index data 240 will be discussed in detail below.

Figure 5:
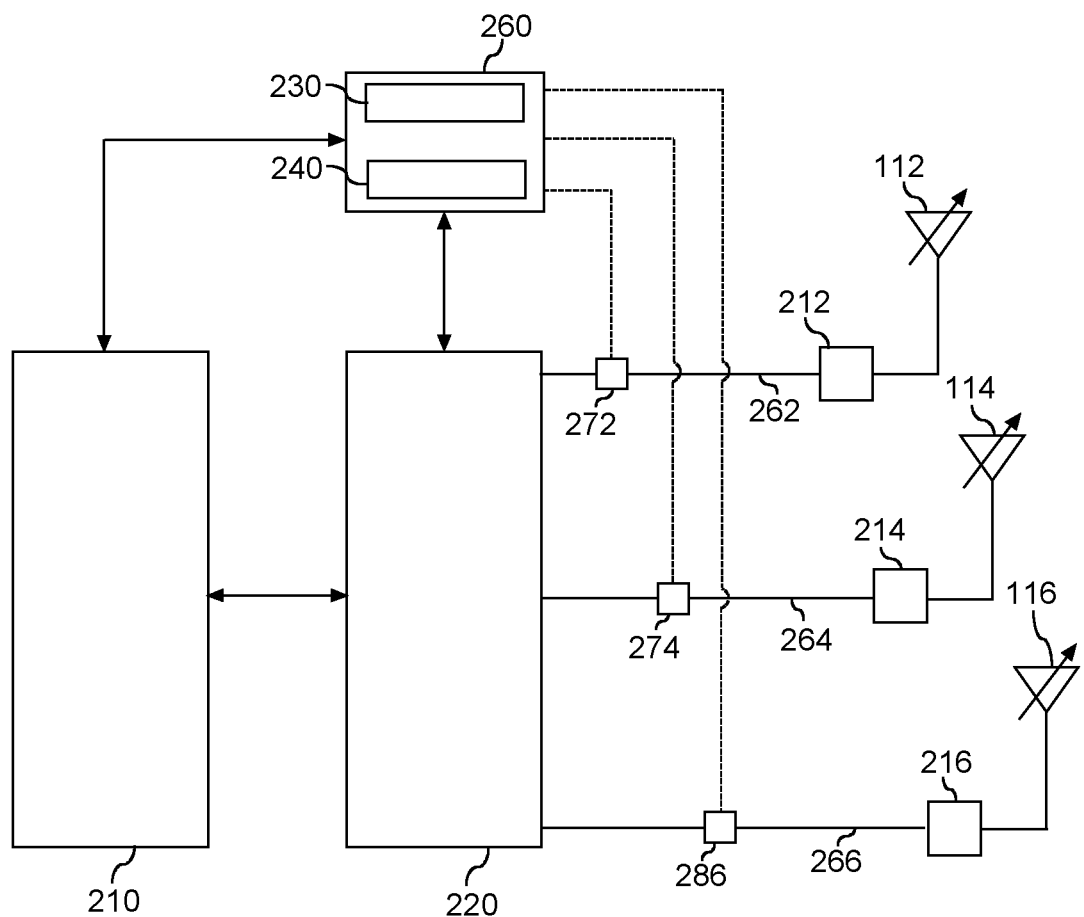
FIG. 5 depicts a schematic of an example access point according to example embodiments of the present disclosure.

FIG. 5 depicts a schematic of another example base station 110 according to example embodiments of the present disclosure. The base station 110 includes RF circuitry 220 (e.g., transceiver, front end module, etc.) The RF circuitry 220 can be configured to communicate RF signals over transmission lines to modal antennas 112, 114, 116, etc. More or fewer modal antennas can be used in the base station 110 without deviating from the scope of the present disclosure.

The RF circuitry 220 can encode information in RF signals for communication via one or more antennas 112, 114, and 116. The RF circuitry 220 can include one or more multiplexing circuits configured to control the communication of frames in, for instance, a time division multiplexed manner. The RF circuitry 220 can include other components for conditioning the RF signals communicated by antennas 112, 114, and 116, such as one or more transceivers, impedance matching circuits, low noise amplifiers, power amplifiers, etc.

As shown, the base station 110 includes one or more control device(s) 210 and 260. In this example, the control device(s) 210 can be any device capable of controlling operation of components of the base station 110. For instance, the control device(s) can include one or more processors (e.g., a host processor, baseband processor, etc.). The control device(s) 260 can include an antenna controller. The antenna controller can control operation of the modal antenna(s) 112, 114, and 116 based on signals/information from the control device(s) 210 (e.g., host processor) and/or the RF circuitry 220.

In some embodiments, the control device(s) 210 and 260 can execute computer-readable instructions stored in memory to cause the control device(s) 210 and 260 to perform operations, such as any of the operations disclosed herein.

In the example of FIG. 5, the control device(s) 260 can control the modal antennas 112, 114, and 116 by modulating control signals onto transmission lines for providing RF signals to antennas 112, 114, and 116. For example, control device(s) 260 can modulate a control signal onto a transmission line 262 (e.g., coaxial transmission line) using various modulation techniques (e.g., amplitude shift keying, etc.) to control antenna configuration module 212 via a bias tee circuit 272. Control device(s) 260 can modulate a control signal onto a transmission line 264 (e.g., coaxial transmission line) using various modulation techniques (e.g., amplitude shift keying, etc.) to control antenna configuration module 214 via a bias tee circuit 274. Control device(s) 260 can modulate a control signal onto a transmission line 266 (e.g., coaxial transmission line) using various modulation techniques (e.g., amplitude shift keying, etc.) to control antenna configuration module 216 via a bias tee circuit 276.

Antenna configuration module 212 can include and/or can control one or more active elements associated with modal antenna 112 to configure the antenna 112 in one of a plurality of different modes based on control signal(s) received over transmission line 262. Antenna configuration module 214 can include and/or can control one or more active elements associated with modal antenna 114 to configure the antenna 114 in one of a plurality of different modes based on control signal(s) received over transmission line 264. Antenna configuration module 216 can include and/or can control one or more active elements associated with modal antenna 116 to configure the antenna 116 in one of a plurality of different modes based on control signal(s) received over transmission line 266.

The control device(s) 260 can execute a control routine 230 (e.g., algorithm) that configures the mode of the one or more of the modal antennas 112, 114, 116 on a per frame, per client, per antenna basis to enhance signal quality with communication to client device(s). For instance, during a first frame when communicating with a first client device, the control device(s) 210 can configured to operate one or more of the modal antenna(s) 112, 114, 116 in a first set of modes. During a second frame when communicating with a second client device, the control device(s) 210 can configured to operate one or more of the modal antenna(s) 112, 114, 116 in a second set of modes.

The control routine 230 can select a set of modes for operating the one or more antennas 112, 114, 116 to enhance signal quality and/or optimize signal quality of communication with a client device during the frame. In some embodiments, the control routine 230 can select the set of modes based on CQI(s) associated with communicating with the client device during the frame to enhance signal quality. The CQI(s) can include one or more of can include, for instance, signal-to-noise ratio (SNR), signal to interference-plus-noise ratio (SINR), receive signal strength indicator (RSSI), bit error rate (BER), a magnitude error ratio (MER), an error vector magnitude (EVM), a block error rate (BLER), a packet error rate (PER) combinations of the foregoing, and/or various other metrics.

In some embodiments, the control routine 230 can select a set of modes can select a set of modes for operating the one or more antennas 112, 114, 116 to enhance signal quality and/or optimize signal quality of communication with a client device during the frame based on client index data 240. Client index data 240 can include data that associates a particular mode for modal antennas 112, 114, and 116 to a particular client device. For instance, the client index data 240 can correlate an optimum mode (e.g., mode with the highest or near highest CQI metric) of a modal antenna(s) with a particular client device. The client index data can be stored and/or implemented in one or more memory devices. The client index data can be implemented as a lookup table, matrix, data structure, function, algorithm or other implementation that correlates a particular mode of a modal antenna to a client device.

Example client index data 240 is illustrated in FIG. 4. The client index data 240 can be based on CQI. For instance, the modes associated with each client device can be determined for the client index data 240 based on CQI associated with communicating with the client device. Example methods for training/generating client index data 240 will be discussed in detail below.

Figure 6:
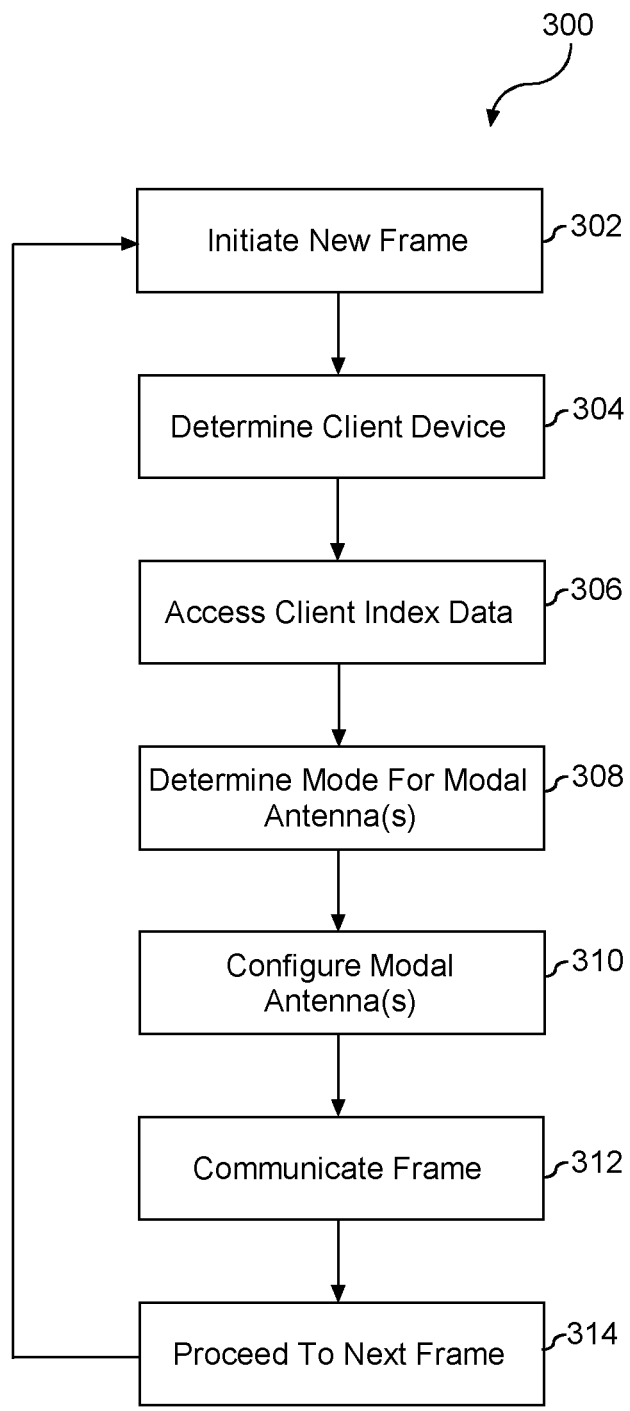
FIG. 6 depicts a flow diagram of an example method according to example embodiments of the present disclosure.

FIG. 6 depicts a flow diagram of an example method (300) according to example embodiments of the present disclosure. The method (300) can be implemented, for instance, using any of the communication systems or components of the communication systems (e.g., base stations) discussed herein. The method (300) illustrates steps performed in a particular order for purposes of illustration and discussion. Those of ordinary skill in the art, using the disclosures provided herein, will understand that various steps of any of the methods discussed herein can be adapted, modified, performed simultaneously, rearranged, include steps not illustrated, and/or expanded in various ways without deviating from the scope of the present disclosure.

At (302), the method includes initiating a new frame. For instance, a first frame can be to transmit to client A. A second frame can be used to receive from client A. A third frame can be used to transmit to client B. A fourth frame can be used to receive from client B, and so forth. A frame can have any suitable length. Frames change when adjusting from transmit to receive. Frames change when communicating with different client devices. According to aspects of the present disclosure and as illustrated in FIG. 6, the method (300) can be implemented on a per frame basis (e.g., every frame).

At (304), the method includes determining the client device with which the base station is communicating during the frame. This can be determined, for instance, by one or more control data based on signals from RF circuitry, such as a transceiver.

At (306), the method includes accessing client index data, for instance, from memory. As described above, client index data can include data that associates a particular mode for one or more modal antenna(s) to a particular client device. For instance, the client index data can correlate an optimum mode (e.g., mode with the highest or near highest CQI metric) of a modal antenna(s) with a particular client device. The client index data can be stored and/or implemented in one or more memory devices. The client index data can be implemented as a lookup table, matrix, data structure, function, algorithm or other implementation that correlates a particular mode of a modal antenna to a client device. Example client index data is illustrated in FIG. 4.

At (308) of FIG. 6, the method includes determining a mode for operating one or more modal antennas based at least in part on the client index data and the client identified at (304). For instance, the mode can be determined as the mode associated with the client identified at (304) in the client index data.

At (310), the method includes configuring the modal antenna(s) in the determined mode. For instance, control signals can be provided to an antenna configuration module. The antenna configuration module can include and/or can control one or more active elements to adjust a mode of the modal antenna(s) to be the mode determined at (308).

At (312), the method includes communicating data in the frame while the modal antenna is configured in the mode. The method then proceeds to the next frame (314) where the method (300) repeats itself. In this way, the method (300) can adjust modes of modal antenna(s) on a per frame, per client, per antenna basis in a point to multipoint communication system.

Figure 7:
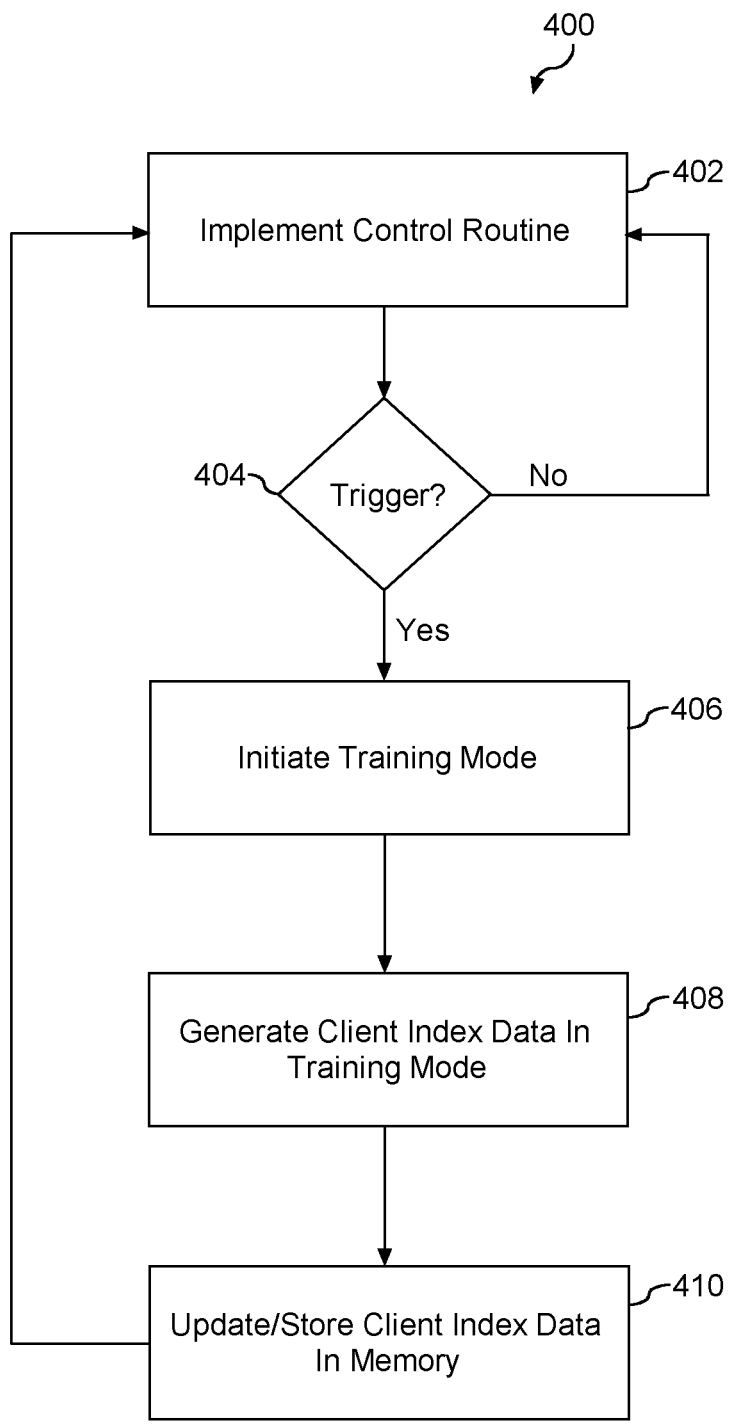
FIG. 7 depicts a flow diagram of an example method according to example embodiments of the present disclosure.

FIG. 7 depicts an example method (400) of generating client index data according to example embodiments of the present disclosure. The method (400) can be implemented, for instance, using any of the communication systems or components of the communication systems (e.g., base stations) discussed herein. The method (400) illustrates steps performed in a particular order for purposes of illustration and discussion. Those of ordinary skill in the art, using the disclosures provided herein, will understand that various steps of any of the methods discussed herein can be adapted, modified, performed simultaneously, rearranged, include steps not illustrated, and/or expanded in various ways without deviating from the scope of the present disclosure.

At (402), the method can include implement a control routine. The control routine can be, for instance, the method (300) of FIG. 6 for configuring modal antennas on per frame, per client, per antenna basis in a point to multipoint communication system.

At (404) of FIG. 7, the method includes determining a trigger condition. If present, the trigger condition can lead to initiating a training mode (404). When no trigger condition is present, the method (400) continues to implement the control routine (402) in normal fashion.

The trigger condition can be defined in any suitable manner. As one example, the trigger condition can be associated with startup or set up of the communication system. As another example, a trigger condition can be the passage of a period of time. In this way, the system can implement the training mode at regular and/or irregular time intervals.

As another example, the trigger condition can be associated with a manual request to enter a training mode. For instance, a user can interact with a user interface to request the system to enter the training mode. The user interface can be, for instance, a button or other interface located on the base station. The user interface can be a graphical user interface presented on a display device associated with the base station. In some instances, the user interface can be associated with a remote device in communication with the base station over a network. For instance, the user interface can be associated with a user device (e.g., smartphone, tablet, etc.) in communication with the base station over a wireless network.

In some embodiments, the trigger condition can be based on a CQI change or based on a use condition. For instance, the system can implement the training mode when a CQI associated with communicating to a particular client device changes by a threshold amount. As another example, the system can implement the training mode when a location associated with client has moved by a threshold amount (e.g., as determined from, for instance, signal strength, data from a positioning system, etc.). In some embodiments, the training mode can be implemented when a new client device joins the communication system.

Referring to FIG. 7, the method (400) can include generating client index data in the training mode. More particularly, when operating in a training mode, CQI(s) associated with communicating with different clients in different modes can be obtained. These CQI(s) can be analyzed to determine an antenna mode(s) for providing increased signal quality (e.g., increased CQI) in communications with a particular client. This mode(s) can be associated with the client device in the client index data. Once the client index data is generated, the client index data can be updated and/or stored in memory (408).

Several different techniques can be implemented for the training mode. For example, the training mode can be implemented as an interframe training mode. Example interframe training modes will be discussed with reference to FIGS. 8 and 9. As another example, the training mode can be implemented as an intraframe training mode. An example intraframe training mode will be discussed with reference to FIG. 10.

Figure 8:
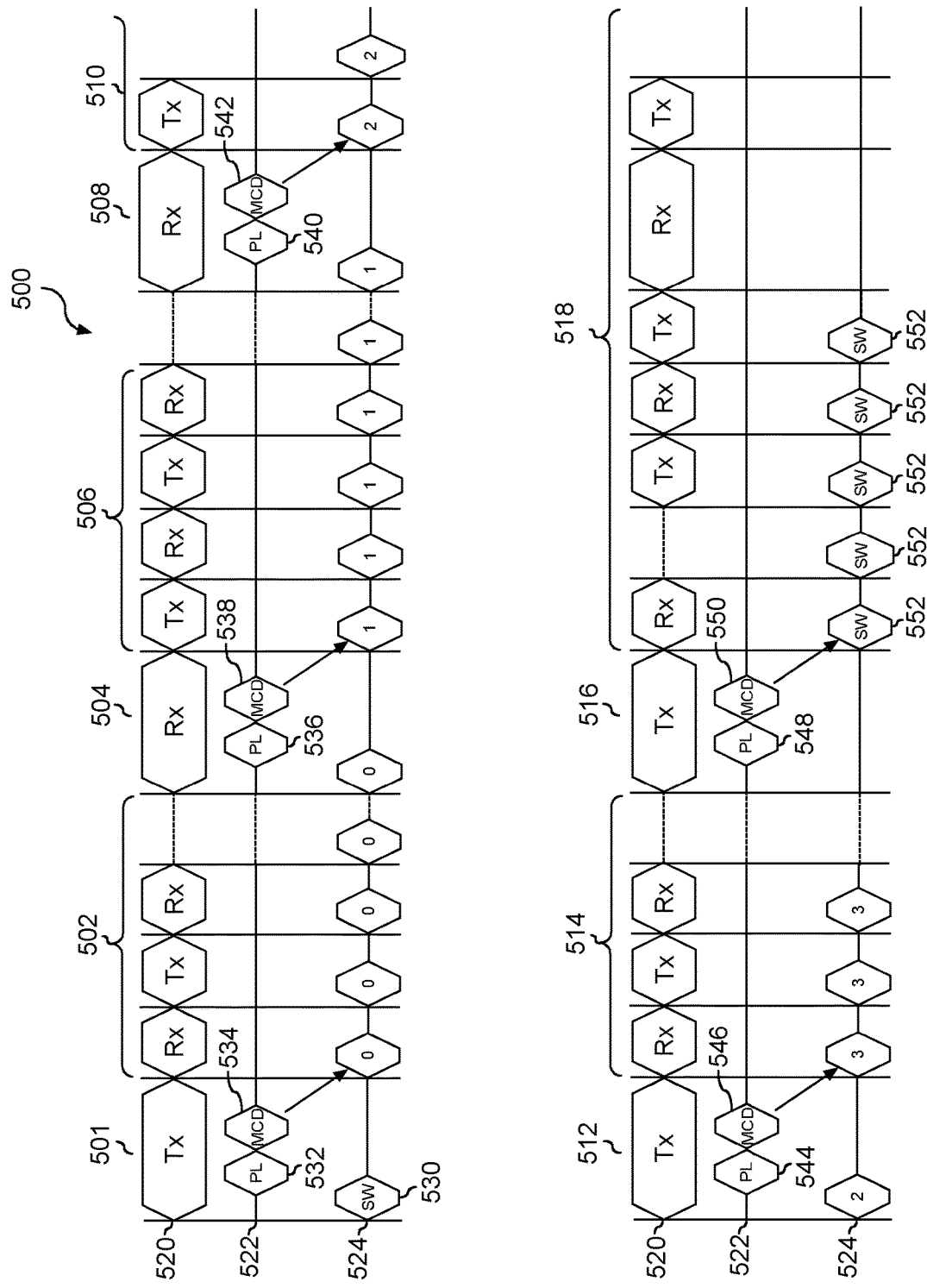
FIG. 8 depicts example interframe training for a communication system according to example embodiments of the present disclosure.

FIG. 8 depicts a sequence of frames 500 associated with an interframe training mode according to example embodiments of the present disclosure. The interframe training mode in FIG. 8 is implemented in both transmit and receive frames for a client. Line 520 for a frame represents whether the frame is a transmit frame or a receive frame. Line 522 for a frame represents control actions for one or more control device(s) (e.g., host processor, antenna controller, etc.) occurring during the frame. Line 524 for a frame represents the controlled antenna mode of operation for a modal antenna during the frame. "SW" in line 524 refers to current best mode of the plurality of modes for operating the antenna (e.g., as determined from previous client index data). "PL" in line 522 refers to a payload having CQI(s) associated with communicating in a particular mode. "MCD" refers to a decision made by the control devices to update the best mode based on the CQI(s).

Referring to FIG. 8, at frame 501 the antenna is configured in the previous best mode at 530 (e.g., as determined from client index data). CQIs associated with operating in the best mode are obtained at 532. A decision to enter into training mode is initiated at 534. Over a next set of transmit and receive frames 502, the modal antenna is controlled to be in mode 0. At frame 504, CQIs associated with mode 0 are obtained at 536. A decision is made at 538 to update the client index data with mode 0 as the best mode if CQIs associated with mode 0 are better than the previous best mode.

Over a next set of transmit and receive frames 506, the modal antenna is controlled to be in mode 1. At frame 508, CQIs associated with mode 1 are obtained at 540. A decision is made at 542 to update the client index data with mode 1 as the best mode if CQIs associated with mode 1 are better than the previous best mode.

Over a next set of transmit and receive frames 510, the modal antenna is controlled to be in mode 2. At frame 512, CQIs associated with mode 2 are obtained at 544. A decision is made at 546 to update the client index data with mode 2 as the best mode if CQIs associated with mode 2 are better than the previous best mode.

Over a next set of transmit and receive frames 514, the modal antenna is controlled to be in mode 3. At frame 516, CQIs associated with mode 3 are obtained at 548. A decision is made at 550 to update the client index data with mode 3 as the best mode if CQIs associated with mode 3 are better than the previous best mode. The antenna can be operated in the best mode 552 during future frames 518 with the client. The interframe training process shown in FIG. 8 can be repeated for each different client in the communication system.

Figure 9:
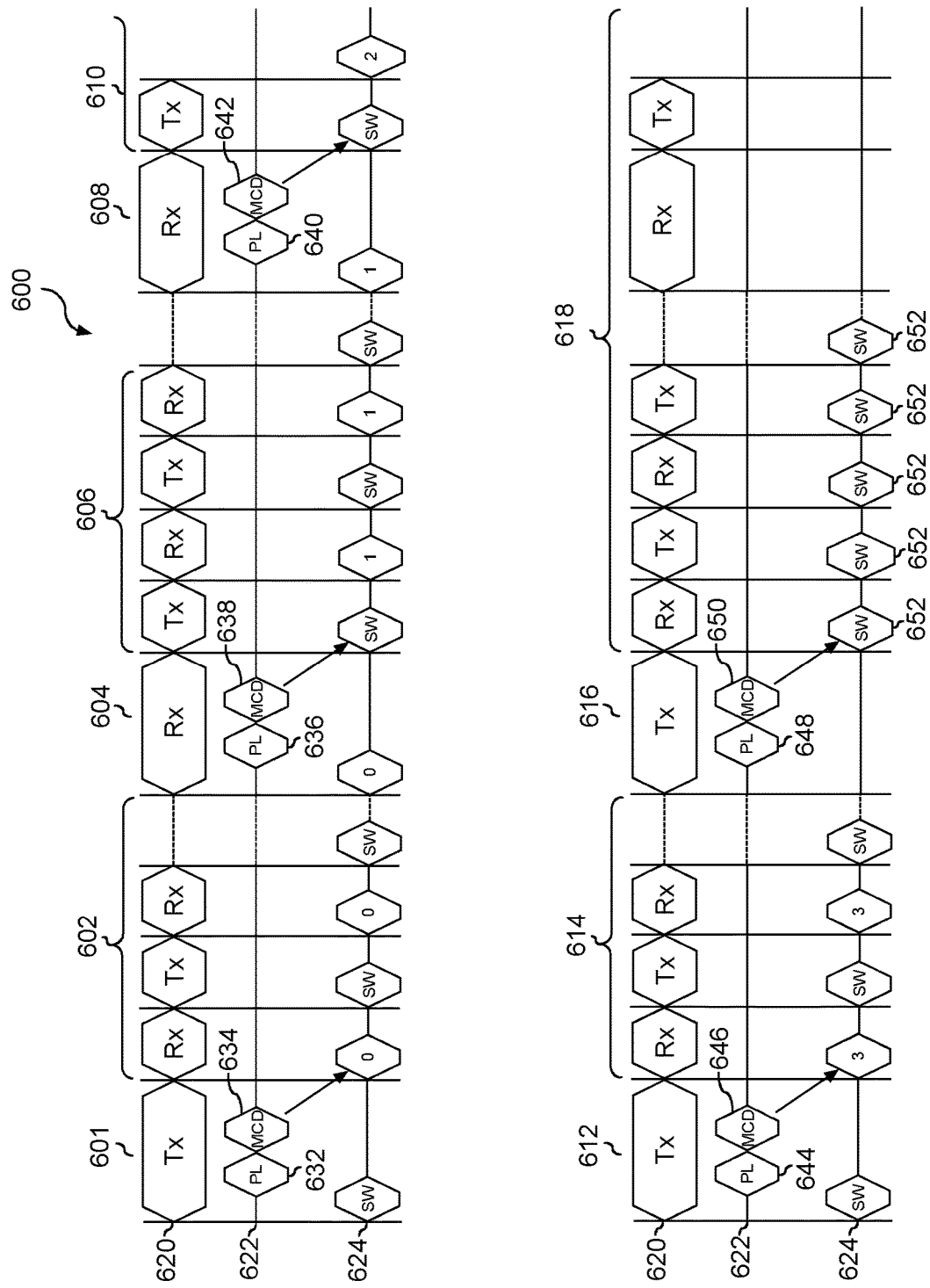
FIG. 9 depicts example interframe training for a communication system according to example embodiments of the present disclosure.

FIG. 9 depicts a sequence of frames 600 associated with an interframe training mode according to example embodiments of the present disclosure. The interframe training mode in FIG. 9 is implemented only in receive frames for a client. Line 620 for a frame represents whether the frame is a transmit frame or a receive frame. Line 622 for a frame represents control actions for one or more control device(s) (e.g., host processor, antenna controller, etc.) occurring during the frame. Line 624 for a frame represents the controlled antenna mode of operation for a modal antenna during the frame. "SW" in line 624 refers to current best mode of the plurality of modes for operating the antenna (e.g., as determined from previous client index data). "PL" in line 622 refers to a payload having CQI(s) associated with communicating in a particular mode. "MCD" refers to a decision made by the control devices to update the best mode based on the CQI(s).

Referring to FIG. 9, at frame 601 the antenna is configured in the previous best mode at 630 (e.g., as determined from client index data). CQIs associated with operating in the best mode are obtained at 632. A decision to enter into training mode is initiated at 634. Over a next set of frames 602, the modal antenna is controlled to be in mode 0 in receive frames only. The modal antenna is controlled to be in the best mode during transmit frames. At frame 604, CQIs associated with mode 0 are obtained at 636. A decision is made at 638 to update the client index data with mode 0 as the best mode if CQIs associated with mode 0 are better than the previous best mode.

Over a next set of frames 606, the modal antenna is controlled to be in mode 1 in receive frames only. The modal antenna is controlled to be in the best mode during transmit frames. At frame 608, CQIs associated with mode 1 are obtained at 640. A decision is made at 642 to update the client index data with mode 1 as the best mode if CQIs associated with mode 1 are better than the previous best mode.

Over a next set of frames 610, the modal antenna is controlled to be in mode 2 in receive frames only. The modal antenna is controlled to be in the best mode during transmit frames. At frame 612, CQIs associated with mode 2 are obtained at 644. A decision is made at 646 to update the client index data with mode 2 as the best mode if CQIs associated with mode 2 are better than the previous best mode.

Over a next set of frames 614, the modal antenna is controlled to be in mode 3 in receive frames only. The modal antenna is controlled to be in the best mode during transmit frames. At frame 616, CQIs associated with mode 3 are obtained at 648. A decision is made at 650 to update the client index data with mode 3 as the best mode if CQIs associated with mode 3 are better than the previous best mode. The antenna can be operated in the best mode 652 during future frames 618 with the client. The interframe training process shown in FIG. 9 can be repeated for each different client in the communication system.

FIG. 9 depicts implementing the training mode in receive frames and not transmit frames. Those of ordinary skill in the art, using the disclosures provided herein, will understand that the training mode can similarly be implemented in transmit frames and not receive frames.

Figure 10:
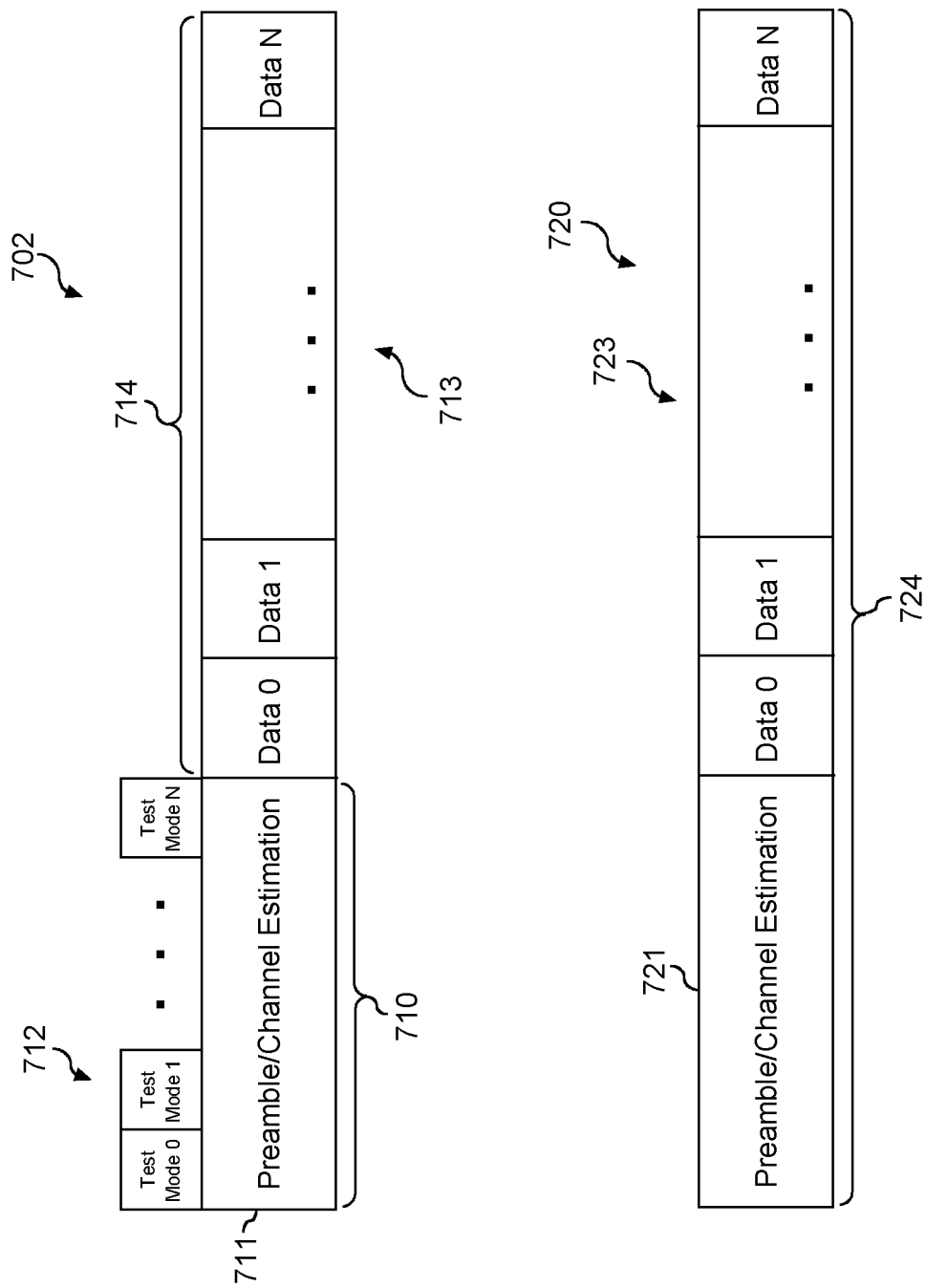
FIG. 10 depicts example intraframe training according to example embodiments of the present disclosure.

FIG. 10 depicts frames associated with an intraframe training mode according to example aspects of the present disclosure. More particularly, a first frame 702 (e.g., a receive frame) can include a preamble/channel estimation portion 711 and a data portion 713. The preamble/channel estimation portion 711 can include symbols/bits associated with a preamble of a packet and/or for channel estimation functions. The data portion 713 can include bits/symbols 713 associated with a payload or data communicated during the frame 702.

During an intraframe training mode, antennas are configured in different modes during the frame and CQI(s) are used to generate client index data. More particularly, during the preamble/channel estimation portion 711 at 712, the antenna can be configured in a plurality of different modes and a best mode can be selected based on CQI(s) for each of the plurality of different modes. During the data portion 713 at 714, the antenna can be configured in the best mode as determined during the preamble/channel estimation portion 711.

FIG. 10 depicts a second frame 720 (e.g., a transmit frame). Similar to the first frame 702, the second frame 720 can include a preamble/channel estimation portion 721 and a data portion 723. The preamble/channel estimation portion 721 can include symbols/bits associated with a preamble of a packet and/or for channel estimation functions. The data portion 723 can include bits/symbols 723 associated with a payload or data communicated during the frame 720. As illustrated during the entire frame at 724, the antenna can be operated in the best mode as determined during the previous first frame 702.

FIG. 10 is discussed with reference to the first frame 702 being a receive frame and the second frame 720 being a transmit frame. In some embodiments, the first frame 702 can be a transmit frame and the second frame 720 can be a receive frame.

Figure 11:
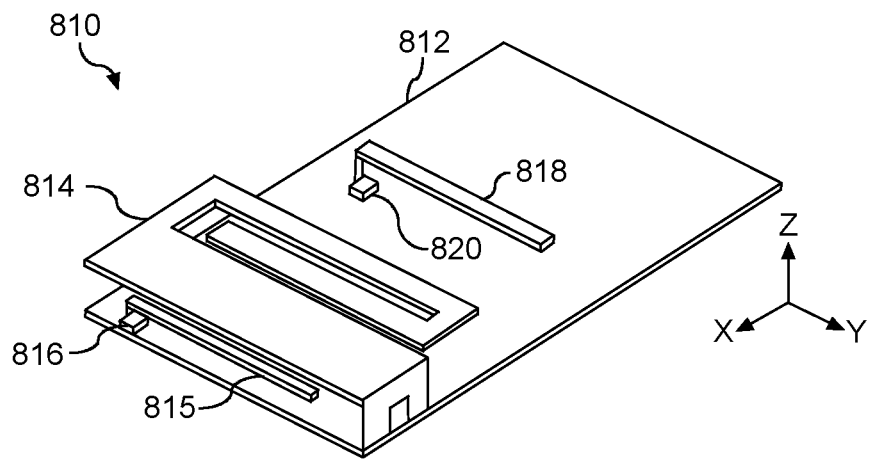
FIGS. 11, 12, and 13 depict aspects of an example modal antenna according to example embodiments of the present disclosure.

FIG. 11 illustrates an example embodiment of a modal antenna 810 that can be used in accordance with aspects of the present disclosure. The modal antenna 810 may include a circuit board 812 (e.g., including a ground plane) and a driven antenna element 814 disposed on the circuit board 812. An antenna volume may be defined between the circuit board (e.g., and the ground plane) and the driven antenna element.

In some embodiments, a first parasitic element 815 may be positioned at least partially within the antenna volume. A first active element 816 may be coupled with the parasitic element 815. The first active element 816 can be a passive or active component or series of components and may be configured to alter a reactance on the first parasitic element

815 either by way of a variable reactance, or shorting to ground, resulting in a frequency shift of the antenna.

In some embodiments, a second parasitic element 818 may be disposed proximate the circuit board 812 and may be positioned outside of the antenna volume. The second parasitic element 818 may further include a second active element 820 which may individually include one or more active and/or passive components. The second active element 820 can be a passive or active component or series of components and may be configured to alter a reactance on the second parasitic element 818 either by way of a variable reactance or shorting to ground, resulting in a frequency shift of the antenna. The second parasitic element 818 may be positioned adjacent the driven element 814 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active element 820 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active element 716 and/or second active element 820 may include at least one of a tunable capacitor, MEMS device, tunable inductor, switch, a tunable phase shifter, a field-effect transistor, or a diode.

Figure 12:
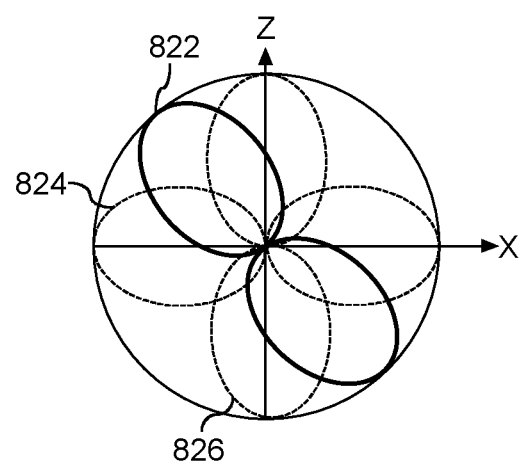

FIG. 12 illustrates a two-dimensional antenna radiation pattern associated with the modal antenna of FIG. 11. The radiation pattern may be shifted by controlling an electrical characteristic associated with at least one of the first and/or second parasitic elements 815, 818 of the modal antenna 810. For example, in some embodiments, the radiation pattern may be shifted from a first mode 822 to a second mode 824, or a third mode 826 and so forth.

Figure 13:
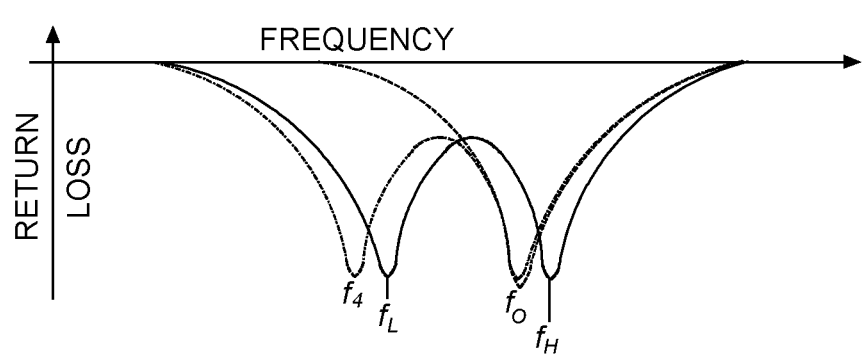

FIG. 13 illustrates an example frequency plot of the modal antenna of FIG. 11 according to example aspects of the present disclosure. The frequency of the antenna can be shifted by controlling an electrical characteristic associated with at least one of the first and/or second parasitic elements 815, 818 of the modal antenna 710. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 11-13 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein, a "modal antenna" refers to an antenna capable of operating in a plurality of modes where each mode is associated with a distinct radiation pattern and/or polarization state. Example modal antennas are described in U.S. Pat. Nos. 9,748,637; 9,240,634; 8,648,755; 8,362,962; and 7,911,402, which are incorporated herein by reference.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for communicating in a point to multipoint communication system, the method comprising:
   communicating data over a plurality of frames in a time division multiplexed manner to a plurality of client devices using one or more modal antennas, each modal antenna operable to be configured in a plurality of different modes, each mode associated with a distinct radiation pattern;
   wherein for each frame, the method comprises:
      identifying the client device for communicating during the frame;
      determining a selected mode of the plurality of modes for the modal antenna to communicate during the frame based at least in part on the client device;
      configuring the one or more modal antennas to operate in the selected mode during the frame;
      wherein determining a selected mode of the plurality of modes for the modal antenna to communicate during the frame based at least in part on the client device comprises:
      accessing client index data associating the client device with the selected mode; and
      determining the selected mode based on the client index data;
      wherein the client index data is generated based at least in part on one or more channel quality indicators obtained while operating the communication system in a training mode;
      wherein the training mode is an intraframe training mode.

2. The method of claim 1, wherein configuring the one or more modal antennas to operate in the selected mode comprises adjusting electrical characteristics of one or more parasitic elements positioned proximate to a radiating element.

3. A wireless network access point, comprising:
   one or more modal antennas operable in a plurality of different modes, each mode associated with a distinct radiation pattern;
   a transceiver configured to communicate with a plurality of client devices over a wireless communication medium via the modal antenna over a plurality of frames;
   one or more control devices configured to control the operation of the one or more modal antennas by selecting a mode of operating the modal antenna on a per frame, per client, per antenna basis;
   wherein the one or more control devices are configured to control the operation of the modal antenna by selecting a mode of operating the modal antenna on a per frame, per client, per antenna basis by performing operations for each frame, the operations comprising:

identifying the client device for communicating during the frame;

determining a selected mode of the plurality of modes for the modal antenna to communicate during the frame based at least in part on the client device;

configuring the one or more modal antennas to operate in the selected mode during the frame;

wherein the operation of determining a selected mode of the plurality of modes for the modal antenna to communicate during the frame based at least in part on the client device comprises:

accessing client index data associating the client device with the selected mode; and determining the selected mode based at least in part on the client index data;

wherein the client index data is generated based at least in part on one or more channel quality indicators obtained while operating the communication system in a training mode;

wherein the training mode is an intraframe training mode.

* * * * *